United States Patent
Knudtzon et al.

(10) Patent No.: US 7,120,597 B1
(45) Date of Patent: Oct. 10, 2006

(54) COMPUTERIZED ACCOUNTING SYSTEMS AND METHODS

(76) Inventors: Kermit Knudtzon, 2509 Cedarwood, Bellingham, WA (US) 98225; Charles Luther Schmidling, 5738 2nd Ave., #7, Ferndale, WA (US) 98248

( * ) Notice: Subject to any disclaimer, the term of this patent is extended or adjusted under 35 U.S.C. 154(b) by 452 days.

(21) Appl. No.: 10/032,780

(22) Filed: Dec. 27, 2001

Related U.S. Application Data (60) Provisional application No. 60/258,678, filed on Dec. 27, 2000.

(51) Int. Cl.
*G07B 17/00* (2006.01)

(52) U.S. Cl. ........................................................ 705/30
(58) Field of Classification Search ................... 705/30, 705/31, 32, 33, 34
See application file for complete search history.

(56) References Cited

U.S. PATENT DOCUMENTS

| | | | | |
|---|---|---|---|---|
| 5,189,608 A | * | 2/1993 | Lyons et al. | 705/30 |
| 5,390,113 A | * | 2/1995 | Sampson | 705/30 |
| 5,991,741 A | * | 11/1999 | Speakman et al. | 705/30 |
| 6,058,375 A | * | 5/2000 | Park | 705/30 |
| 6,144,941 A | * | 11/2000 | Hotti et al. | 705/4 |
| 6,584,453 B1 | * | 6/2003 | Kaplan et al. | 705/39 |
| 6,684,384 B1 | * | 1/2004 | Bickerton et al. | 717/108 |
| 2001/0029475 A1 | * | 10/2001 | Boicourt et al. | 705/30 |

OTHER PUBLICATIONS

White, Ron, How Computers Work, Millennium Ed. Que Corporation, Sep. 1999.*
Derfler, Frank J. et al. How Networks Work, Millennium Ed., Que Corporation, Jan. 2000.*
Borland's ReportSmith for PC and SQL Databases User's Guide, Version 2.5, Boarland International, Inc., Scotts Valley, CA, 1994.*

* cited by examiner

*Primary Examiner*—Andrew J. Fischer
(74) *Attorney, Agent, or Firm*—Michael R. Schacht; Schacht Law Office, Inc.

(57) ABSTRACT

A computerized accounting system adapted to be used by at least first and second groups of users. The system comprises a host accounting system, an overlay system, a host report system, and an overlay report system. The host accounting system allows users to store transaction data representing financial transactions. The overlay system allows users in the second group of users to store overlay adjustment data representing adjusting journal entries related to the financial transactions. The host report system allows users to generate host reports based on the transaction entries. The overlay report system allows users in the second group of users to generate overlay reports based on the transaction entries and the overlay journal entries.

14 Claims, 3 Drawing Sheets

COMPUTERIZED ACCOUNTING SYSTEMS AND METHODS

RELATED APPLICATIONS

This application claims priority of U.S. Provisional Patent Application Ser. No. 60/258,678, which was filed on Dec. 27, 2000.

FIELD OF THE INVENTION

The present invention relates to computerized accounting systems and methods and, more specifically, to such systems and methods intended for use by a plurality of users having different levels of accounting skill and having differing accounting objectives.

BACKGROUND OF THE INVENTION

The purpose of an accounting system is to keep records of a business' financial transactions. Traditionally, accounting systems employ what is referred to as a "general ledger" defining a plurality of "accounts". Each general ledger account has a unique purpose, and each financial transaction is associated with one or more of the general ledger accounts. For example, a typical general ledger will define bank accounts for recording banking transactions, sales accounts for recording sales transactions, and cost accounts for tracking transactions affecting the value of company assets.

One type of transaction employed by traditional accounting systems is an "adjusting journal entry". The purpose of an adjusting journal entry is to adjust summary accounts in the general ledger system to reflect a change to the summary account. Adjusting journal entries are recorded in what is referred to as a "journal". The purpose of the journal is to maintain a history of the adjusting journal entries for the purpose of creating an audit trail.

Computers have long been used to automate the process of accounting for financial transactions. Although specific implementations of a computerized accounting system may vary, computerized accounting systems generally conform to the long-established paradigm of a general ledger comprising a plurality of accounts. Typically, the general ledger is implemented as a computer database, with each general ledger account and each transaction being assigned a unique reference number.

In the context of the present invention, the term "report" will refer to any set of data contained in the general ledger database that has been filtered, sorted, and/or formatted for a particular accounting purpose. A report will typically be associated with a specific function or a specific reporting period defined by beginning and ending dates.

Typically, computerized accounting systems employ separate task modules that create or allow the user to create adjusting journal entries for separate specialized business functions. Each task module displays database reports and interface components that facilitate the entry of adjusting journal entries by the user. Task modules typically maintain the General Ledger summary and journal history either through active posting of individual journal records for each business transaction or batch posting of transactions collected and summarized in a single adjusting journal entry.

Examples of common task modules used by conventional computerized accounting systems include Payroll and Accounts Receivable modules. A payroll module will typically adjust accounts related to employee earnings and payments, while an Accounts Receivable module typically adjusts accounts related to product sales and receipt of funds related to sales.

The use of a computerized database to track accounts and transactions greatly reduces the effort required to compile reports for purposes such as state and federal tax accounting, money or business management (controller reports), GAAP reports for a third party financial institution, and the like. Some of these report formats are highly specialized and have little or no use outside of a specific purpose.

The present invention is of particular significance in the context of a small business in which a mix of employees and outside consultants maintain and access a computerized accounting system. In this context, the accounting system is typically maintained and accessed by at least several users having different accounting purposes and different levels of accounting background.

For the purposes of describing the present invention, users of computerized accounting systems will be referred to as operators, managers, and service providers. Operators are typically employees such as clerks and bookkeepers who perform repetitious or patterned data entry and/or reconciliation tasks on a daily basis. Managers are typically officers or owners of the business and have an unknown or low level of accounting expertise. Managers typically do not maintain the accounting system but instead access reports generated by the accounting system for the purpose of making business decisions. Service providers are typically employee controllers or outside consultants such as public accountants that operate out of what will be referred to herein as a "service center". Service providers typically have access to the accounting system on a periodic basis, often less than daily, for the purpose of generating reports for tax, financing, or other specialized purposes.

An exemplary scenario involving all of these various users would be the purchase of an asset for use by a business. An operator such as a bookkeeper will write a check for the asset using one task module of the computerized accounting system. The task module allows the bookkeeper to identify the appropriate general ledger account, and the system will typically reduce a bank account by the amount of the check and make an adjusting journal entry increasing a cost account to reflect ownership of the asset. A manager may generate a balance sheet report indicating a decrease in the bank account and an increase in the cost account reflecting ownership of the asset. A service provider such as an accountant or controller may subsequently adjust the cost account related to the asset to capitalize tax costs of the asset.

Problems arise when service providers make adjusting journal entries for the purpose of generating two or more specialized reports related to one host accounting system. Conventional accounting systems make it possible to first enter specific adjusting journal entries used only for one given report type (e.g., tax) and/or reporting period.

However, these report-specific journal entries are permanent and cannot be removed; if a report of a second type (e.g., GAAP) and/or reporting period is to be created, entries for the first report type must be cancelled by a matching reversing entry. Then, adjusting journal entries specific to the second report type are entered and the second report created. Entering and then subsequently reversing report specific adjusting journal entries in a host accounting system can be confusing to less experienced operators, and can create problems with report closings.

For these and other reasons, service providers typically do not use the process of entering and then subsequently reversing out adjusting journal entries in a host accounting system. Instead, service providers often use a separate class of software product referred to as "trial balance software". One example of a trial balance software system is available in the marketplace under the tradename Workpapers Plus.

Trial balance software systems typically can connect to the host accounting system database or can use an exported copy of the host database. Using the trial balance system, the user makes adjusting journal entries into the copy of the database for a particular report type and reporting period. The trial balance software typically further contains features that aid the service provider in the creation of specialized paginated reports.

As with a host accounting system, adjusting journal entries made in a trial balance software system are permanent and may be removed only by entering a separate reversal entry. The reversal process prevents the trial balance system from carrying forward to a later reporting period the adjusting journal entries used in an earlier reporting period.

The need thus exists for computerized accounting systems that conform to conventional accounting paradigms but which allow operators, managers, and service providers to interact more productively with the accounting system.

SUMMARY OF THE INVENTION

The present invention is a computerized accounting system adapted to be used by at least first and second groups of users. The system comprises a host accounting system, an overlay system, a host report system, and an overlay report system. The host accounting system allows users to store transaction data representing financial transactions. The overlay system allows users in the second group of users to store overlay adjustment data representing adjusting journal entries related to the financial transactions. The host report system allows users to generate host reports based on the transaction entries. The overlay report system allows users in the second group of users to generate overlay reports based on the transaction entries and the overlay journal entries.

DETAILED DESCRIPTION OF THE PREFERRED EMBODIMENTS

The present invention is a computerized accounting system comprising an overlay system that isolates certain accounting data from users without the background or authority to modify or view this data. The overlay system may be embodied as an add-on to existing host accounting systems; alternatively, the host accounting system may be designed to implement the overlay system of the present invention. In the following discussion, the first embodiment discloses the present invention in the form of an add-on system, while the second embodiment discloses the present invention in the form of a modified host accounting system. While the present invention is of particular significance in the following implementations, the present invention may be embodied in other forms as well.

I. First Embodiment

Figure 1:
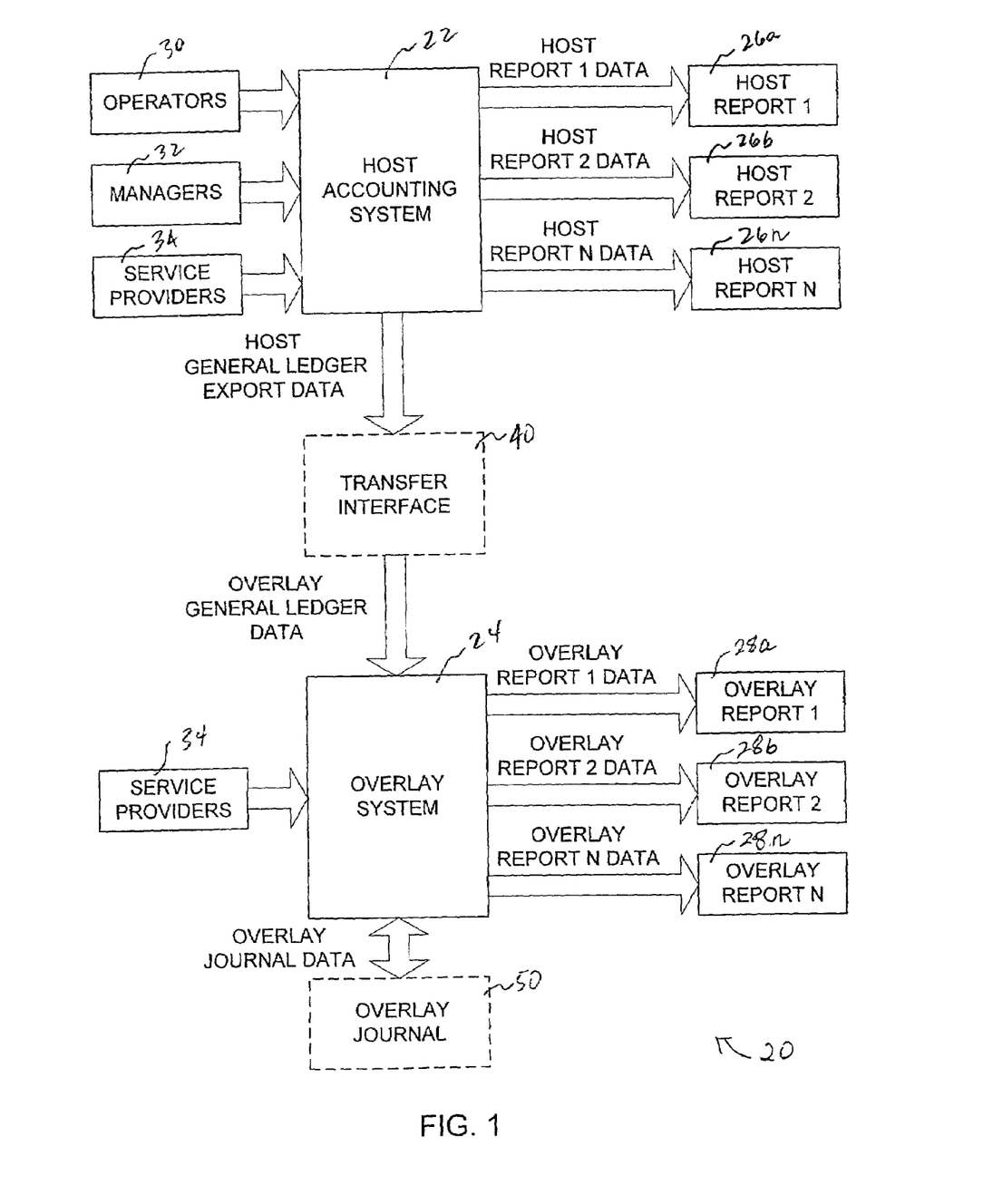
FIG. 1 is a block diagram of a first embodiment of an accounting system constructed in accordance with, and embodying, the principles of the present invention.

Referring now to the drawing, depicted at FIG. 1 therein is a first embodiment of a computerized accounting system 20 implementing the principles of the present invention. The exemplary system 20 comprises a host accounting system 22 and an overlay system 24. The overlay system 24 is entirely separate from the host system 22 but generates one or more overlay reports 26 based on general ledger data obtained from the host system 22.

The host and overlay systems 22 and 24 are typically formed by a combination of hardware and software capable of implementing the present invention as described herein. The systems 22 and 24 may operate on a single computer, a plurality of unconnected computers, a local network of computers, or a distributed network of computers. The systems and methods of the present invention may be implemented using one or more of a variety of operating systems.

The host accounting system 22 is or may be a conventional computerized accounting system. The present invention will be described herein with reference to a commercially available accounting system sold by the assignee of the present invention under the tradename DATASCAN. However, the DATASCAN system is simply one exemplary computerized accounting system, and the present invention may be implemented using one or more other computerized general ledger accounting systems. Presently available accounting systems that may be used as the host accounting system 22 in addition to or in place of the DATASCAN system include Quickbooks, Peachtree, Great Plains, and the like. The exemplary host accounting system 22 thus is or may be well-known and will be described herein only to extent necessary for a complete understanding of the present invention.

As shown in FIG. 1, a variety of users, classified as operators 30, managers 32, and service providers 34 as described above, typically access and/or maintain the host accounting system 22. In contrast, the overlay system 24 is typically accessed and maintained by service providers 34, such as controllers or public accountants, with a relatively high level of accounting expertise.

Typically, the host accounting system 22 allows the users 30, 32, and 34 to export what will be referred to as host general ledger data. In most cases, the host general ledger data may be exported in any one of a number of data formats.

For the purposes of the present discussion, it will be assumed that the host accounting system 22 generates the host general ledger data in a format that cannot be read directly by the overlay system 24. In this case, therefore, the system 20 further comprises an optional transfer interface module 40 that converts the host general ledger data into what will be referred to as overlay general ledger data. The differences between the host general ledger data and the overlay general ledger data are primarily due to such factors as file and data formats, and the conversion of the data from the host format to the overlay format does not affect the underlying financial transactions represented by the general ledger data.

Accordingly, instead of using the actual host general ledger data, the exemplary overlay system 22 uses a copy or converted version of the host general ledger data. The service providers 34 may make adjusting journal entries for the purpose of generating the specialized reports 26 using the overlay system 24 and not the host system 22. The service providers 34 using the overlay system 24 thus do not interact with the data files created and maintained by the host accounting system 22, but instead interact only with the copy or version of the general ledger data contained in these files.

The service provider may make adjusting journal entries using either the host accounting system 22 or the overlay system 24. Certain adjusting journal entries may need to be permanent adjusting entries and will be entered using the host accounting system 22. But many of these adjusting journal entries are report type or reporting period specific and will be made solely using the overlay system 24.

The use of the overlay system 24 thus segregates the routine maintenance of the host accounting system 22 from the more arcane accounting functions performed by the service provider 34. The service provider 34 only occasionally accesses the host accounting system 22 and does not unnecessarily access the host system 22 to make subsequently reversed adjusting journal entries.

However, the overlay system 24 uses essentially the same financial data as the host accounting system 22. Therefore, the service provider 34 can create the overlay reports 26 based on this financial data and any adjusting entries made in the overlay system 24. The host accounting system 22 typically has a separate mechanism that allows any of the users 30, 32, and 34 to create one or more host reports as identified by reference character 28 in FIG. 1.

FIG. 1 further depicts an optional overlay journal 50 that is preferably used by the overlay system 24 to track some or all of the adjusting entries used to create the overlay reports 26. The overlay journal 50 may be embodied as a computer database containing some or all of the adjusting entries made by the service provider 34 using the overlay system 24. The overlay journal 50 creates an audit trail that supports the data contained in the overlay reports 26.

Figure 2:
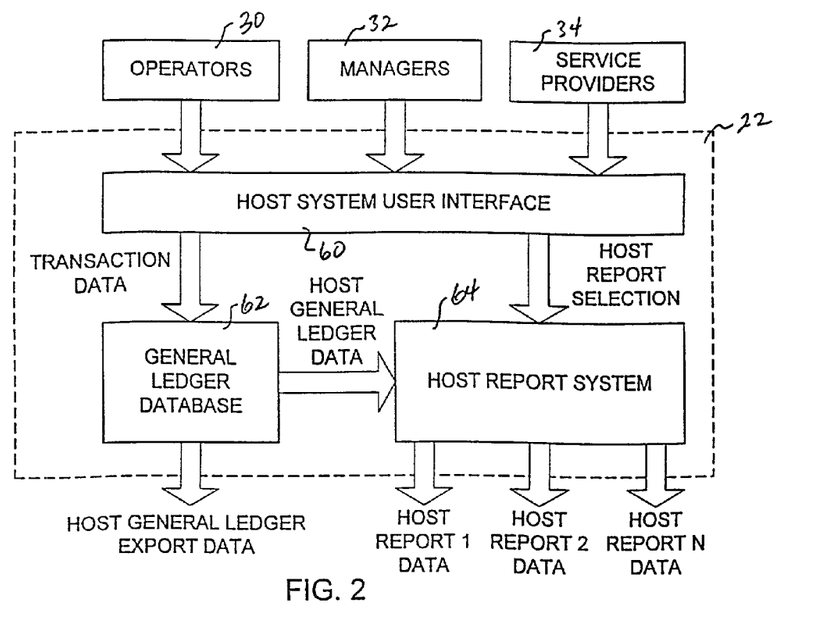
FIG. 2 is a block diagram of an exemplary host accounting system that may be used as part of the accounting system depicted in FIG. 1.

Referring now to FIG. 2, the host accounting system 22 will be described in further detail. The host accounting system 22 comprises a general ledger database 60, a host system user interface 62, and a host report system 64. The general ledger database 60 is typically comprised of a proprietary or open database program configured to store and allow access to transaction data related to financial transactions of a given entity. More specifically, the general ledger database 60 is configured to configure, store, and allow access to general ledger and journal records in either detail or summary form.

The user interface system 62 is a combination of input devices, output devices, and software that allows one or more of the operators 30, managers 32, and service providers 34 to interact with general ledger database 60 and/or generate reports using the host report system 64; this interaction between the various users 30, 32, and 34 and the general ledger database 60 includes entering transaction data into and deleting transaction data from the database 60.

Figure 3:
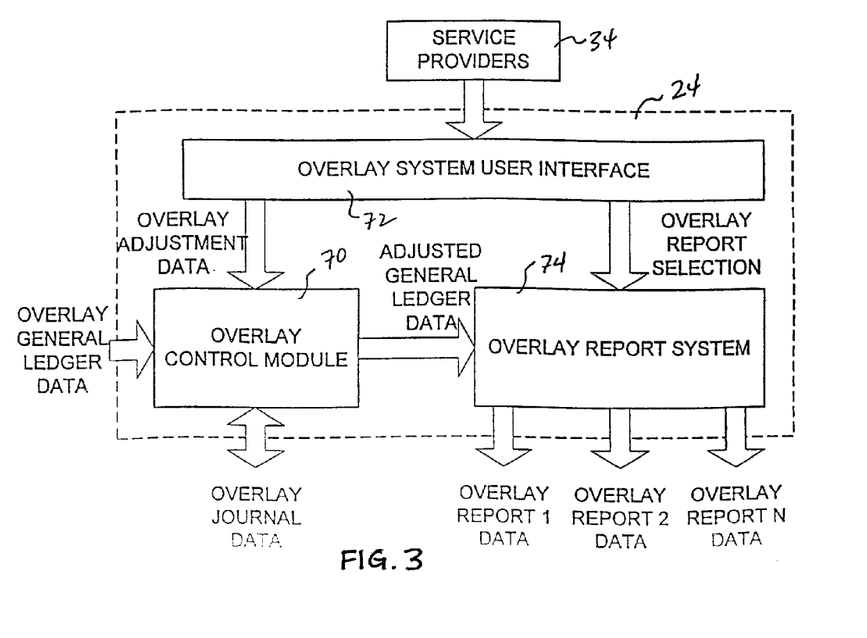
FIG. 3 is a block diagram of an exemplary overlay system of the accounting system depicted in FIG. 1.

As generally described above, the host accounting system 22 is typically comprised of a number of task modules; the task modules are collectively represented in FIG. 2 by the host system user interface 62. As indicated in FIGS. 1–3, the user interface system 62 of the host accounting system 22 allows all of the user groups to store transaction data in the general ledger database 60. The use and implementation of the task modules as the host system user interface 62 is well-known in the art and will not be described herein in further detail.

The host report system 64 generates standard and custom reports by filtering, sorting, and/or formatting the host general ledger data contained in the general ledger database 60. The host report system 64 typically but not necessarily uses a query language associated with the general ledger database 60. The host system user interface 62 allows the user to make selections and input data as necessary to generate queries that extract data from the general ledger database 60 and format this extracted data in a manner defined by the report types.

The reports generated by the host report system 64 include internal reports for use by the host system user interface 62 to facilitate database maintenance functions. For example, specialized internal reports may be used in individual task modules to create invoices, reconcile bank accounts, and the like. The host report system 64 further generates the external host reports identified by reference character 28 described above. The host reports 28 include standard management reports such as profit and loss reports, balance sheet reports, sales reports, receivables reports, payables reports, and the like.

Conventionally, the general ledger database 60 is capable of exporting the host general ledger data in one or more export formats as shown in FIGS. 1 and 2. The export format can be a data format native to the general ledger database 60, a standardized data format such as a tab or comma delimited file, or a specialized data format adapted to be read by a particular third party application. The host general ledger export data may be detail transaction data or summaries of data; the host general ledger export data can further be defined for a particular reporting period. Even if the host general ledger data cannot be exported in a conventional sense, the file containing this data can be copied and processed as generally described below.

The host general ledger export data may thus be exported or copied on numerous occasions to reflect subsequent entries into and maintenance of the general ledger database 60. The host general ledger export data will thus typically be exported in a number of data sets; typically each data set is associated with a given time period.

In the exemplary system 20, the transfer interface 40 is designed to take either a native format or standardized format data file and convert it into a file that may be read by the overlay system 24. The exemplary transfer interface 40 thus establishes compatibility between the host accounting system 22 and the overlay system 24. The conversion process implemented by the transfer interface 40 may either be automatic, user assisted, or manual. The conversion process is represented in FIG. 1 by the change of name of the data file from the host general ledger export data (before conversion) to the overlay general ledger data (after conversion).

The conversion process may be automated if the details of both the host accounting system 22 and the overlay system 24 are known in advance. In this case, a program can be created to translate retrieval requests from the overlay system 24 to the host accounting system 22 and then transfer the resultant data to the overlay accounting system 24 in a useable format.

The conversion process may be user assisted if native data formats of one or both of the systems 22 and 24 are unknown. The user can define a conversion protocol by associating the data format used by the host accounting system 22 with the data format used by the overlay system 24.

In some situations, the transfer interface 40 may be implemented by manually reentering summary reports generated by the host accounting system 22 into the overlay system 24.

An alternative is to program the host accounting system 22 to generate a specialized data format that may be read by the overlay system 24. Another alternative is simply to program the overlay system 24 so that it may read the format native to the host accounting system 22. A combination of any or all of these approaches may be most practical in a commercial embodiment of the present invention.

Referring now to FIG. 3, the overlay system 22 will be described in further detail. The overlay system 22 comprises an overlay control module 70, an overlay system user interface 72, and an overlay report system 74. The overlay system user interface 72 allows the service providers to enter overlay adjustment data representing adjusting journal entries associated with the transaction data entered using the host system user interface 62. The overlay control module 70 combines overlay adjustment data created at the overlay system 24 with the transaction data of host general ledger data maintained by the host accounting system 22.

The overlay system user interface 72 is, like the host system user interface, formed by a combination of input devices, output devices, and software. Again, the overlay system user interface 72 may be organized into separate task modules defined by particular accounting functions.

One function of the overlay system user interface 72 is to allow the service providers 34 to enter the overlay adjustment data to be combined with the overlay general ledger data. The overlay adjustment data represents the adjusting journal entries required by a particular overlay report type. The overlay interface 72 further allows the service providers 34 to interact with the overlay report system 74 to select an overlay report type and generate one or more overlay reports 26 in the format of the selected overlay report type.

Another function of the overlay interface 72 is to limit access to the overlay system 24. One implementation of an access limiting system is to set a permission for each user that determines whether a particular user can access the overlay system 24. The permission can be enforced by password in a secure implementation of the present invention. Another method of limiting access to the overlay system 24 is simply not to load the software on a computer that may be accessed by a user that does not have permission to use the overlay system. The access limiting system may further be implemented completely separate from the software embodying the principles of the present invention. For example, operators and managers may simply be trained not to use the overlay system user interface 72, thereby limiting unauthorized access to the overlay system 24.

The overlay control module 70 combines the overlay adjustment data with the overlay general ledger data to obtain adjusted general ledger data. The adjusted general ledger data is filtered, sorted, and/or formatted by the overlay report system 74, as determined by the selected overlay report type or types, to obtain the overlay reports 26.

The overlay control module 70 may be a database program such as that used to implement the general ledger database 60. In this case, the overlay control module 70 persistently stores the adjusted general ledger data for filtering, sorting, and/or formatting by the overlay report system 74.

Alternatively, the overlay adjustment data may be stored in a volatile memory location. In this case, the overlay control module 70 merges the overlay adjustment data with the overlay general ledger data to obtain the adjusted general ledger data for further processing by the overlay report system 74.

The exemplary overlay system user interface 72 allows the user to select a desired report type from a list of available report types and define criteria for a specific instance of one of the report types. Typical report types that will be contained in the list of available overlay report types include balance statements, profit and loss statements, and audit trail reports. Each report type contains report definitions in the form of queries or other instructions defining the filtering, sorting, and/or formatting necessary to create a given overlay report 26.

To create an instance of one of the report types, the user will typically enter such information as the reporting period, transaction category, and the like. For example, the user may enter the reporting period by defining beginning or ending dates or by selecting predefined reporting periods such as last calendar year, this fiscal year, last quarter, etc. The general ledger defined by the host accounting system 22 may categorize transactions by department or class, and the overlay system user interface 72 may also allow the selection of one or more such categories when determining the report parameters.

The overlay system user interface 72 further may optionally comprise a report type generation module that allows the user to generate a custom report type. The custom report type would include criteria necessary to filter, sort, and/or format the adjusted general ledger data to allow this data to be presented to the user in a desired form.

The optional overlay journal 50 persistently stores at least some overlay adjustment data used by the overlay system 24 as overlay journal data. The overlay journal data stored by the overlay journal 50 will typically be dated and may be associated with a particular report type. The date and report type information allows the overlay journal data to be used in subsequent reports of the appropriate type and including the appropriate reporting period.

The overlay journal 50 thus obviates the need for the service providers 34 to re-enter adjusting journal entries during subsequent reporting cycles if those adjusting journal entries were also relevant to an earlier reporting cycle. For example, overlay adjustment data associated with a first quarter report may be entered at the end of the first quarter and saved as overlay journal data in the overlay journal 50. The overlay journal data associated with that first quarter would not be included in, for example, the third quarter report but would be used in a second quarter report. Also, any overlapping year-to-date reports after the first quarter (e.g., six months, nine months, twelve months) would not utilize overlay journal data for any in-between period, thereby minimizing the need for reversing entries.

The overlay journal data, whether persistently stored or created in real time, will typically be arranged as a plurality of records. Each record corresponds to a single adjusting journal entry and will typically comprise a plurality of fields containing information that allows the overlay journal data to be combined with the overlay general ledger data. The details of the information contained in the overlay journal data fields will depend upon the details of the overlay general ledger data but will typically contain such information as an amount of the adjusting entry, general ledger account name and/or number, and/or date of the adjusting entry. Other information contained in the overlay journal data fields might include transaction class, department, user identification, the particular report type with which the record is associated, and the like.

The overlay control module 70 will merge the overlay adjustment data (and/or the overlay journal data) with the overlay general ledger data at the time the overlay reports 26 are created. In particular, the overlay control module 70 will match the overlay journal data on a record by record basis with the overlay general ledger accounts based on the information contained in the overlay journal data records.

For example, one record of the overlay journal data may correspond to a decrease in a sales tax general ledger account to be entered as of a particular date. Based on the name, or more likely number, of the sales tax general ledger account, the amount of the decrease will be included in the sales tax general ledger account of the adjusted general ledger data. This adjusting journal entry will result in the total of the sales tax general ledger account entries being decreased by the appropriate amount in the adjusted general ledger data. Accordingly, when a report is created based on the adjusted general ledger data, the reduction in the sales tax general ledger account will reflect the reduction thereto.

This process does not require modification to the host general ledger data. In addition, the adjusting journal data may be saved as overlay journal data in the overlay journal 50 and subsequently combined with another set of overlay general ledger data created at a later time or for another time period. Any changes in the underlying host general ledger data will thus be carried through to the adjusted general ledger data created by the overlay control module 70.

When used, the overlay journal 50 maintains, separate from the host accounting system 22, one or more sets of overlay journal data corresponding to the overlay adjustment data. Each set of overlay journal data contains a plurality of records associated with an adjusting journal entry. Each set of overlay journal data may be associated with a particular report type, or each record of the overlay journal data may be associated with a particular report type as discussed above. In any case, each record or set will also be associated with a specific point in time so that appropriate overlay journal data may be combined with a particular set of overlay general ledger data.

Referring now to Exhibit A attached hereto, contained therein is a paper describing in further detail the background of and theoretical basis for the computerized accounting system of the present invention. Exhibit B is an operators manual describing the operation of one exemplary embodiment of the present invention adapted for use by the Datascan host accounting software system. Exhibit B further contains several examples of the overlay reports created using the overlay control module of the Datascan overlay system. The materials disclosed in Exhibits A and B are disclosed as background only and are not intended to limit or otherwise narrow the scope of the present invention.

The computerized accounting system of the present invention thus does not require that adjusting journal entries for specialized report types be made in the host accounting system 22. Instead, when a report of a specialized type is desired, the adjusting journal entries associated with that report type are created and/or stored separately from the host general ledger data. The adjusting journal entries are merged with overlay general ledger data based on the host general ledger data to create overlay reports. Subsequent overlay reports for overlapping time periods can be created using previously entered adjusting journal entries. Separate sets of overlay adjustment data can be created for different types of reports.

II. Second Embodiment

Figure 4:
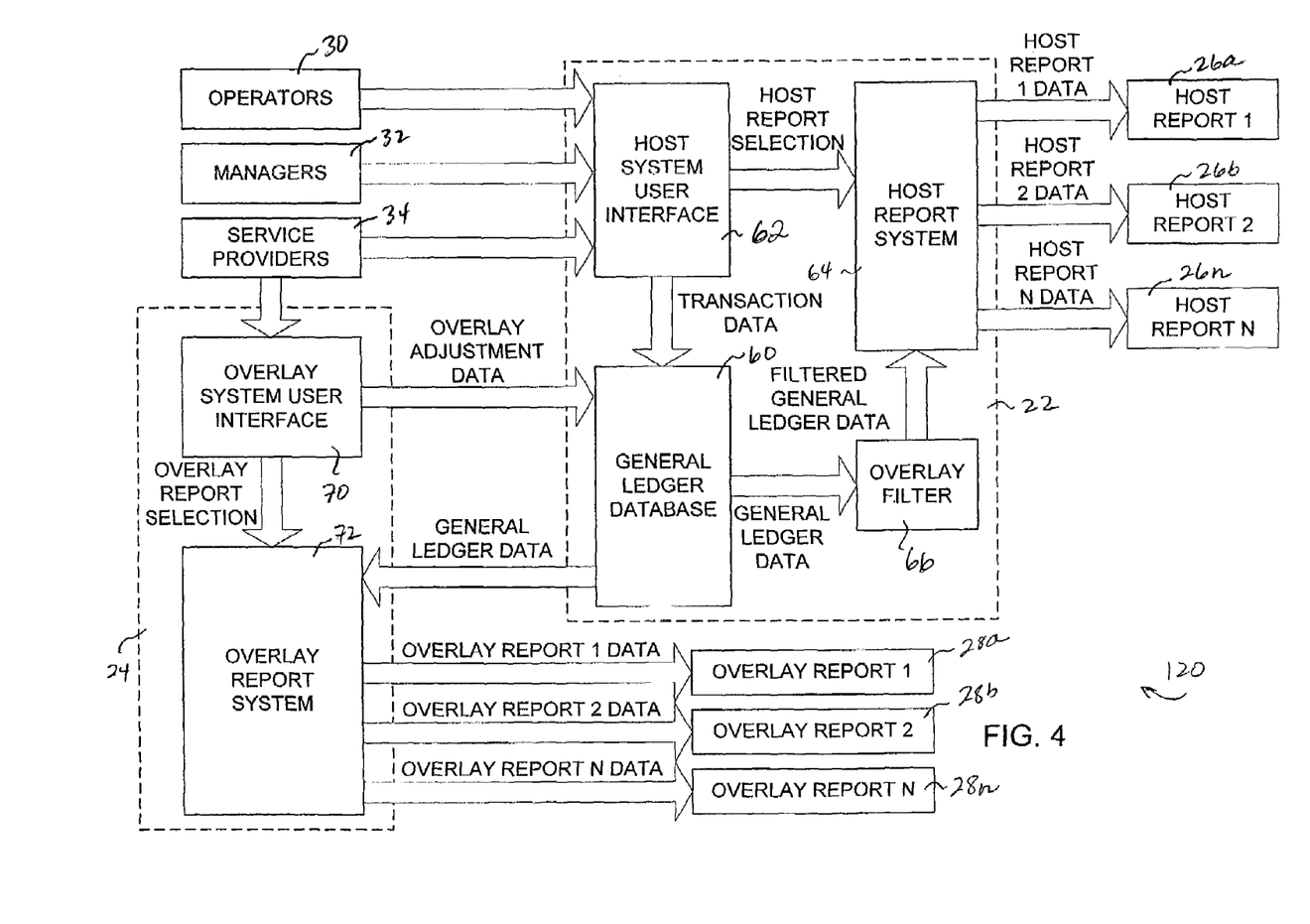
FIG. 4 is a block diagram of a second embodiment of an accounting system constructed in accordance with, and embodying, the principles of the present invention.

Referring now to FIG. 4 of the drawing, depicted at 120 therein is a second embodiment of a computerized accounting system implementing the principles of the present invention. The exemplary system 120 comprises a host accounting system 122 and an overlay system 124. The exemplary overlay system 124 is integrated into the host system 122 and generates one or more overlay reports 126 based on general ledger data stored in the host system 122.

The host and overlay systems 122 and 124 are typically formed by a combination of hardware and software capable of implementing the present invention as described herein. The systems 122 and 124 may operate on a single computer, a plurality of unconnected computers, a local network of computers, or a distributed network of computers. The systems and methods of the present invention may be implemented using one or more of a variety of operating systems.

The host accounting system 122 may be a conventional computerized accounting system. The exemplary host accounting system 122 is, however, modified as will be described below to contain the functions of the overlay system 124.

As shown in FIG. 4, a variety of users, classified as operators 130, managers 132, and service providers 134 as described above, typically access and/or maintain the host accounting system 122. However, the functions of the overlay system 124 are typically accessed and maintained by only by service providers 134, such as controllers or public accountants, with a relatively high level of accounting expertise.

The service providers 134 enter adjusting journal data using either the host accounting system 122 or the overlay system 124. Certain adjusting journal entries may need to be permanent adjusting entries and will be entered using the host accounting system 122. But many of these adjusting journal entries are report type or reporting period specific and will be made solely using the overlay system 124.

The host accounting system 122 typically has a separate mechanism that allows any of the users 130, 132, and 134 to create one or more host reports as identified by reference character 128 in FIG. 4. The use of the overlay system 124 segregates the routine maintenance and access of the host accounting system 122 from the more arcane accounting functions performed by the service provider 134. This separation isolates the operators 130 and managers 132 from the functions of the overlay system 124.

The exemplary overlay system 124 uses the same financial data as the host accounting system 122. When the service provider 134 enters report or period specific adjusting journal entries, these entries are stored as overlay adjustment data in the host accounting system 122. Therefore, the service provider 134 can create the overlay reports 126 based on financial data entered by the users 130, managers 132, and/or service providers 134 using the host system 122 and any overlay adjustment data entered by the service providers 134 using the overlay system 124.

The host accounting system 122 will be described in further detail. The host accounting system 122 comprises a general ledger database 160, a host system user interface 162, a host report system 164, and an overlay filter 166.

The general ledger database 160 is typically comprised of a proprietary or open database program configured to store and allow access to transaction data related to financial transactions of a given entity. More specifically, the general ledger database 160 is configured to configure, store, and allow access to general ledger and journal records in either detail or summary form.

The user interface system 162 is a combination of input devices, output devices, and software that allows one or more of the operators 130, managers 132, and service providers 134 to interact with general ledger database 160 and/or generate reports using the host report system 164; this interaction between the various users 130, 132, and 134 and the general ledger database 160 includes entering transaction data into and deleting transaction data from the database 160.

As generally described above, the exemplary host accounting system 122 is also typically comprised of a number of task modules; the task modules are collectively represented in FIG. 4 by the host system user interface 162. The use and implementation of the task modules as the host system user interface 162 is well-known in the art and will not be described herein in further detail.

The host report system 164 generates standard and custom reports by filtering, sorting, and/or formatting the host general ledger data contained in the general ledger database 160. The host report system 164 typically but not necessarily uses a query language associated with the general ledger database 160. The host system user interface 162 allows the user to make selections and input data as necessary to generate queries that extract data from the general ledger database 160 and format this extracted data in a manner defined by the report types.

The reports generated by the host report system 164 include internal reports for use by the host system user interface 162 to facilitate database maintenance functions. For example, specialized internal reports may be used in individual task modules to create invoices, reconcile bank accounts, and the like. The host report system 164 further generates the host reports identified by reference character 128 described above. The host reports 128 include standard management reports such as profit and loss reports, balance sheet reports, sales reports, receivables reports, payables reports, and the like.

The overlay system 124 comprises an overlay system user interface 170 and an overlay report system 172. The overlay system user interface 170 is, like the host system user interface, formed by a combination of input devices, output devices, and software. Again, the overlay system user interface 170 may be organized into separate task modules defined by particular accounting functions. At a minimum, the overlay system user interface 170 allows service providers 134 to enter the overlay journal data representing adjusting journal entries related to the overlay reports 126.

The overlay interface 172 further allows the service providers 134 to interact with the overlay report system 174 to select an overlay report type and generate one or more overlay reports 126 in the format of the selected overlay report type.

In the exemplary system 120, the transaction data entered using the host system user interface 162 and the overlay adjustment data entered using the overlay system user interface 170 are both stored in the general ledger database 160. The overlay report system 172 filters, sorts, and/or formats general ledger data, as determined by the selected overlay report type or types, to obtain the overlay reports 126.

However, the overlay filter 166 is arranged between the general ledger database 160 and the host report system 164. The overlay filter 166 allows the users of the host system 122 to see a filtered general ledger data set. In particular, overlay journal data stored in the general ledger database is flagged or otherwise identified as data that should be viewed only by users of the overlay system 124 and not users of the host system 122. The overlay filter 166 prevents any data so flagged or otherwise identified from being accessed, viewed, or altered by the users of the host system 122.

The implementation of the second embodiment of the present invention thus presumes that the design of the general ledger database may be altered. In particular, the programmer may assign one or more fields to each record in the general ledger database 160 as necessary to allow only qualified users of the overlay accounting system 124 to access the entire general ledger database. Thus, possibly confusing report specific overlay journal data is seen only by such qualified users and not by users, such as the operators 130 and managers 132, who may be confused by such data.

Conventional host accounting systems conventionally comprise access limiting features in the form of permissions that limit access to certain functions based on the user's identity. For example, only managers and service providers, and not relatively low level operators, may have be given permission to access payroll functions. The same access limiting or permission systems may be used to prevent unauthorized access to the overlay system 124. For example, the permissions associated with each user may include a box that is checked to allow the user to access the overlay system 124; when unchecked, the user may not use the overlay system 124.

The exemplary overlay system user interface 172 allows the user to select a desired report type from a list of available report types and define criteria for a specific instance of one of the report types. The programmer may further assign additional fields in each record to indicate that a particular record containing overlay journal data is to be used only by a particular report type.

Thus, when a user of the overlay system 124 creates an instance of one of the report types, the user will typically enter such information as the report type, reporting period, transaction category, and the like. The overlay report system 172 will generate the overlay report data for the selected report type by comparing the report type field of each record with the selected report type; the overlay report data will contain only records with report type fields that match the selected report type.

The overlay system user interface 172 further may optionally comprise a report type generation module that allows the user to generate a custom report type. The custom report type would include criteria necessary to filter, sort, and/or format the adjusted general ledger data to allow this data to be presented to the user in a desired form.

The computerized accounting system 120 has the same functional advantages as the system 20 described above and may be preferred if the principles of the present invention are to be implemented in a host system by the publisher of the host system.

The present invention may be embodied in forms other than those described above, and the scope of the present invention should be determined by the following claims and not the foregoing detailed description.

What is claimed is:

1. A computerized accounting system, comprising:
 a host accounting system, where the host accounting system stores, in a general ledger database, transaction data representing financial transactions that occur over a time period;
 an overlay system, where the overlay system enters overlay adjustment data representing adjusting journal entries related to the transaction data stored in the general ledger database, and stores the overlay adjustment data in first and second overlay data sets, where the first overlay data set contains the overlay adjustment data related to the transaction data in the general ledger database at a first point in time during the time period, and the second overlay data set contains the overlay adjustment data related to the transaction data in the general ledger database at a second point in time during the time period, where the second point in time is after the first point in time;

a host report system, where the host report system creates host reports based on the transaction data stored in the general ledger data set; and an overlay report system, where the overlay report system generates a first overlay report based on the transaction data stored in the general ledger data set at the first point in time and the overlay adjustment data in the first overlay data set; and a second overlay report based on the transaction data stored in the general ledger data set at the second point in time and the overlay adjustment data in the first and second overlay data sets.

2. A system as recited in claim 1, in which:
the overlay report system creates an overlay general ledger database containing overlay general ledger data based on the host general ledger database.

3. A system as recited in claim 2, further comprising a transfer interface module for converting the host general ledger data into the overlay general ledger data.

4. A system as recited in claim 1, in which the overlay system comprises an overlay journal database for storing the first and second overlay data sets.

5. A system as recited in claim 1, further comprising an overlay filter for generating filtered general ledger data based on the general ledger data, where the host report system creates the host reports based on the filtered general ledger data.

6. A system as recited in claim 1, in which the system is adapted to be used by at least first and second sets of users, the system further comprising an access limiting system for limiting access to the overlay system by the first group of users.

7. A system as recited in claim 1, in which:
the overlay system stores the first and second overlay data sets in the general ledger database; and
the system further comprises a filter for generating a first filtered data set based on the general ledger database, whereby
the first filtered data set contains the transaction data stored in the general ledger data set; and
the host report system generates reports based on the first filtered data set.

8. A system as recited in claim 7, in which:
the filter further generates
a second filtered data set based on the general ledger database, where the second filtered data set contains the transaction data stored in the general ledger data set at the first point in time and the overlay adjustment data stored in the first overlay data set;
a third filtered data set based on the general ledger database, where the third filtered data set contains the transaction data stored in the general ledger data set at the second point in time and the overlay adjustment data stored in the first and second overlay data sets; and
the overlay report system generates the first and second overlay reports based on the second and third filtered data sets, respectively.

9. A system as recited in claim 1, in which:
the host accounting system defines a host system user interface; and
the overlay system defines an overlay system user interface.

10. A system as recited in claim 1, further comprising an access limiting system for limiting access to the overlay system user interface.

11. A system as recited in claim 1, in which:
the host accounting system defines a plurality of general ledger accounts; and
the transaction data is associated with one of the general ledger accounts.

12. A system as recited in claim 1, in which the adjusting journal entries adjust at least one of the general ledger accounts.

13. A system as recited in claim 1, in which the overlay adjustment data is associated with one of first and second time periods.

14. A system as recited in claim 1, in which:
the adjusting journal entries corresponding to the overlay adjustment data in the first and second overlay data sets are associated with a first accounting function;
the overlay system further stores third and fourth sets of overlay data sets, where the adjustment data in the third and fourth overlay data sets are associated with a second accounting function; and
the overlay report system generates
a third overlay report based on the transaction data stored in the general ledger data set at the first point in time and the overlay adjustment data in the third overlay data set; and
a fourth overlay report based on the transaction data stored in the general ledger data set at the second point in time and the overlay adjustment data in the second and third overlay data sets.

* * * * *